Oct. 1, 1940. H. J. SALISBURY 2,216,457
RACK
Filed Oct. 26, 1938
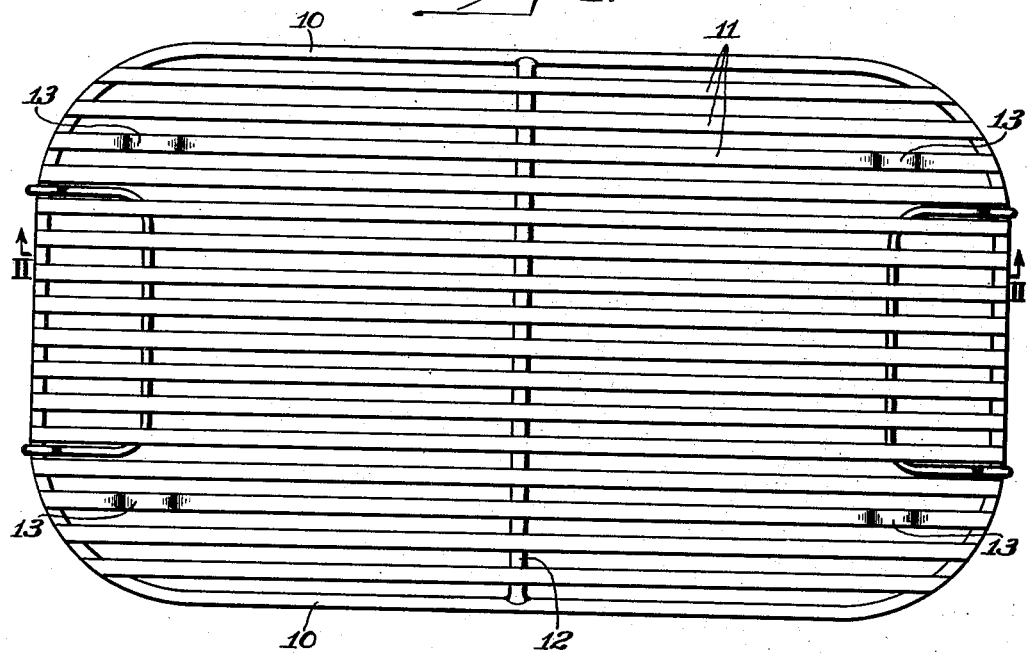
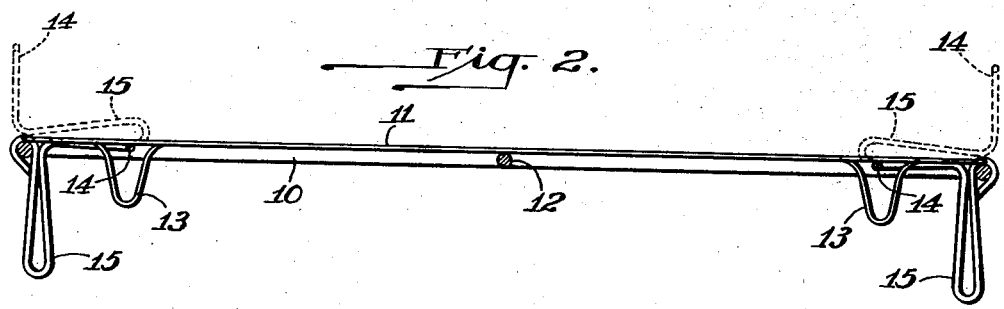
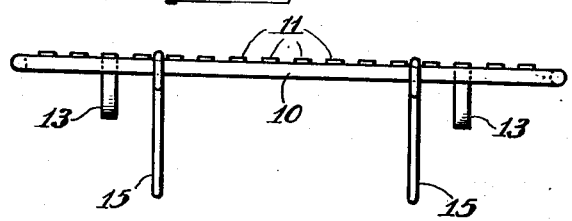
INVENTOR.
HARRY J. SALISBURY
BY
S. Ernest Lewis
ATTORNEY.

Patented Oct. 1, 1940

2,216,457

UNITED STATES PATENT OFFICE 2,216,457

RACK

Harry J. Salisbury, New Kensington, Pa., assignor to Aluminum Company of America, Pittsburgh, Pa., a corporation of Pennsylvania Application October 26, 1938, Serial No. 236,987

8 Claims. (Cl. 53—1)

This invention relates to cooking utensils, and particularly to utensils of the general type including a rack fitting within a vessel or pan. Such racks are used in broilers and canners, for example, and my invention is particularly applicable to such utensils.

It is an object of my invention to provide a rack adapted to rest within a pan or vessel at either of two levels. More particularly, it is an object of the invention to provide a unitary attachment for racks comprising handles and an auxiliary set of legs which may be brought selectively to effective positions through pivotal movement without obstructing the supporting area of the rack.

One embodiment of the invention which is particularly adaptable for use as a broiler rack is shown in the accompanying drawing, in which:

Fig. 1 is a top plan view of a rack showing the attachments of my invention at either end thereof in position to serve as supporting legs for the rack;

Fig. 2 is a vertical sectional view taken on the line II—II of Fig. 1, showing the attachments in position to serve as legs and in dotted lines in position to serve as handles; and Fig. 3 is an end elevation of the rack.

In the form of the invention shown in the drawing, the rack comprises a frame 10 which substantially defines the shape of the rack, and a plurality of metal straps 11 secured in any desired manner to the frame 10 to form a grill. The frame 10 is preferably made of wire or rod and, if desired, may have a central reinforcing strut 12 soldered or welded thereto. Two of the metal straps 11 are made somewhat longer than the other straps, and are provided with U-shaped portions 13, bent out of the plane of the remainder of the straps. When the long straps with the U-shaped portions are attached to the frame 10, the U-shaped portions 13 are disposed downwardly.

There is provided at either end of the rack an attachment, preferably made of wire, that comprises a U-shaped handle or bail portion 14, pivotally secured to the frame 10 by looped ends, and a pair of legs 15 disposed so that their planes of rotation are preferably normal to the handle portion. The legs 15 are conveniently formed integrally with the handle portion 14 by providing the upper end of each arm thereof with a closed and somewhat flattened loop of suitable length. It is preferred that the radius of the free ends of the legs 15 be a substantial one to insure against, and avoid weakening of the wire in the bending operation and assure a suitably stable support, particularly when the legs are so disposed that their center lines are normal to the handle portion. To increase stability the legs 15 may be disposed so that they have a slight inward thrust in rack supporting position.

In use, with the parts in the positions shown in the drawing, the rack is adapted to be received within a utensil such as a broiler pan, the loops 15 of the wire attachment serving as supporting legs. It will be seen that in the position shown in the drawing, and as best shown in full lines in Fig. 2, the bight of the handle portion 14 bears against the under side of the rack, so that the legs 15 can not collapse inwardly. In this position, for example in a broiler pan, the rack serves for broiling food in thin slices, such as bacon or the like, or foods which require broiling close to the flame. When broiling thicker foods or foods requiring slow broiling more remote from the flame, the attachments are swung about their loop connection with the frame 10 to the position shown in dotted lines in Fig. 2. In this position the bent portions 13 of the straps 11 serve as supporting means, the handle portions 14 of the attachments extending upwardly while they are grasped to lift the rack into and out of the broiler pan. When the rack comes to rest in the pan in the lower position the handles 14 will fall inwardly only until the legs 15 rest on the bottom of the pan at a distance below the rack equal to the length of the legs 13, so that the handles 14 are always in position to be grasped, when the rack is not being supported at its higher level upon legs 15. If desired, the legs 15 may be offset or enlarged adjacent their bases, or otherwise provided with projections, which would prevent the legs from passing through the spaces between the straps 11 and thereby maintain the handles 14 in their vertical dotted-line position, shown in Fig. 2, when the rack is supported on legs 13. The rack may be carried by the handles and placed in the pan at either level, because if it is desired to use the rack at the higher level the attachments are quickly and easily swung to their full line position shown in the drawing.

From the above description it will be apparent that, without the use of locking means or any complicated structure, I have provided a rack which is simple in construction, easy to clean, adapted to be used at either of two different levels, and provided with handles by which it can be lifted. Furthermore, this is accomplished without in any way obstructing the area of the rack, all of the rack surface being clear to support food as, for example, for broiling.

It will be understood that my invention is not limited by the specific embodiment which is chosen for the purpose of illustration. For example, it will be obvious that the straps 11 may extend across the narrower dimension of the frame, in which event the pivotal attachments, which may be of any desired number, may be disposed adjacent the longer dimension of the frame, so that the legs 15 will be in line with spaces between straps. Further, the supports 13 may be integral with the frame 10 instead of with the grill 11, or these three parts may be made integral by casting. It is possible also to make the frame of circular, oval or other shape, so long as the attachment may be secured with the legs 15 in line with spaces between straps 11. Any other modification can be made within the scope of the appended claims.

What I claim is:

1. A rack for cooking utensils comprising a body portion, downwardly disposed supporting means on the body portion, handles pivotally attached to the body portion, and supporting means disposed substantially normal to said handles.

2. A rack comprising a frame, a grill, downwardly disposed supporting means on said rack, handle members pivotally attached to said frame and supporting means disposed substantially normal to said handle members.

3. A rack for cooking utensils comprising a frame, a grill secured to the frame, downwardly disposed supporting means on said grill, handle members pivotally attached to said frame, and supporting means integral with said handle members and disposed substantially normal thereto.

4. A rack for cooking utensils comprising a bent wire frame, a plurality of metal straps secured to said frame in parallel spaced relation, downwardly disposed supporting means on said rack, handle members pivotally attached to said frame, and supporting means integral with said handle members.

5. A rack for cooking utensils comprising a bent wire frame, a plurality of metal straps secured to said frame in parallel spaced relation, a plurality of downwardly disposed, substantially U-shaped supporting means on said straps, a handle member pivotally attached to said frame at each of two opposed positions thereon, and supporting means integral with said handle members, said second-named supporting means being longer than said first-named supporting means.

6. A rack for cooking utensils comprising a bent wire frame, a plurality of metal straps secured to said frame in spaced parallel relation to form a grill, downwardly disposed supporting legs on said grill, and a pair of bent wire attachments each secured at its ends to said frame at points between pairs of straps, each of said bent wire attachments comprising a central handle portion and leg portions disposed substantially normal to the handle portion.

7. A pivotal attachment for broiler racks or the like comprising a wire bent to provide a central substantially U-shaped portion and reversely bent end portions disposed normally to and at one side of the plane of the U-shaped portion.

8. A pivotal attachment for broiler racks or the like comprising a wire bent to provide a central substantially U-shaped portion and reversely bent end portions disposed normally to and at one side of a plane extending axially through the two arms and the bight of the U-shaped member.

HARRY J. SALISBURY.